United States Patent
Mitchell et al.

(10) Patent No.: US 10,248,962 B2
(45) Date of Patent: Apr. 2, 2019

(54) PROFITABILITY SIMULATOR

(71) Applicant: Oracle International Corporation, Redwood Shores, CA (US)

(72) Inventors: Kara Mitchell, Littleton, CO (US); Aaron Johnson, Castle Pines, CO (US); Eric Vance, Aurora, CO (US)

(73) Assignee: Oracle International Corporation, Redwood Shores, CA (US)

( * ) Notice: Subject to any disclaimer, the term of this patent is extended or adjusted under 35 U.S.C. 154(b) by 671 days.

(21) Appl. No.: 14/247,754

(22) Filed: Apr. 8, 2014

(65) Prior Publication Data

US 2014/0304034 A1 Oct. 9, 2014

Related U.S. Application Data

(60) Provisional application No. 61/809,856, filed on Apr. 8, 2013.

(51) Int. Cl.
*G06Q 30/02* (2012.01)

(52) U.S. Cl.
CPC ................. *G06Q 30/0202* (2013.01)

(58) Field of Classification Search
CPC ................................................. G06Q 30/0202
USPC ....................................................... 705/7.31
See application file for complete search history.

(56) References Cited

U.S. PATENT DOCUMENTS

| | | | |
|---|---|---|---|
| 7,516,083 B1 * | 4/2009 | Dvorak | G06Q 20/203 705/22 |
| 8,458,348 B2 | 6/2013 | Vance et al. | |
| 8,838,612 B2 | 9/2014 | Berlener et al. | |
| 9,086,783 B2 | 7/2015 | Nowakowski et al. | |
| 2004/0088211 A1 * | 5/2004 | Kakouros | G06Q 30/0202 705/7.31 |
| 2004/0088240 A1 * | 5/2004 | Komaki | G06Q 10/06 705/36 R |
| 2007/0225949 A1 * | 9/2007 | Sundararajan | G06Q 10/04 703/2 |
| 2011/0231848 A1 * | 9/2011 | Long | G06F 9/546 718/101 |
| 2012/0072431 A1 | 3/2012 | Berlener et al. | |
| 2012/0150576 A1 * | 6/2012 | Wagenblatt | G06Q 10/063 705/7.12 |
| 2012/0254137 A1 * | 10/2012 | Rozenwald | G06F 17/30545 707/700 |
| 2012/0272041 A1 | 10/2012 | Vance et al. | |
| 2013/0080353 A1 * | 3/2013 | Kovarsky | G06Q 40/06 705/36 R |
| 2013/0086526 A1 | 4/2013 | Nowakowski et al. | |
| 2014/0304031 A1 | 10/2014 | Holder et al. | |

(Continued)

OTHER PUBLICATIONS

Hyper-Threading (Hyper-Threading, referenced from Wayback Machine Jan. 21 2013, https://web.archive.org/web/20130121000437/https://en.wikipedia.org/wiki/Hyper-threading).*

(Continued)

*Primary Examiner* — Johnna R Loftis
*Assistant Examiner* — Matthew D Henry
(74) *Attorney, Agent, or Firm* — Vista IP Law Group, LLP

(57) ABSTRACT

Disclosed are methods and apparatuses for generating sales data reports. One approach is provided for receiving time information, simulation information, and forecast parameters to generate on the fly revenue and profitability reports for past historical data and future forecasts.

30 Claims, 13 Drawing Sheets

(56) References Cited

U.S. PATENT DOCUMENTS

2014/0304032 A1    10/2014   Mitchell et al.
2017/0031578 A1     2/2017   Shakespeare et al.

OTHER PUBLICATIONS

Parallel Computing (Parallel Computing, referenced from Wayback Machine Jan. 16, 2013 https://web.archive.org/web/20130116175549/https://en.wikipedia.org/wiki/Parallel_computing).*

* cited by examiner

PROFITABILITY SIMULATOR

CROSS-REFERENCE TO RELATED APPLICATIONS

The present application claims the benefit of priority to U.S. Provisional Application No. 61/809,856, entitled "PROFITABILITY SIMULATOR" filed on Apr. 8, 2013, which is hereby incorporated by reference in its entirety.

BACKGROUND

In a sales environment, ERP (Enterprise Resource Planning) systems may be used to store thousands or millions of sales order records. Distribution managers of ERP systems have a need to view historical and forecasted metrics of their sales data so that they can accurately provide a price and cost for their items. These metrics may include historical and forecasted revenue, profit, profit margin, cost, and price, and are preferably viewed in a graphical form that is easier for the manager to compare and analyze. In addition, any forecasted price, cost, and sales volume can be affected by a variety of variables with little or no warning (such as the cost of materials changing due to a disruption in supply). Managers have the desire to be able to view this data preferably in a graphical format and then be allowed to make what if changes to price, cost, and/or forecast sales volume to see how it effects their profit, and profit margin. It is also beneficial to be able to store these what if scenarios and then compare them to actual sales data at some point in the future.

Thus there is a need for ERP applications with the ability to perform large what-if scenarios over what may be many millions of sales order records on the fly.

SUMMARY

Some embodiments of the present invention presents methods, systems, and computer program products for generating on the fly revenue and profitability reports for past historical data and future forecasts.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION

Figure 1:
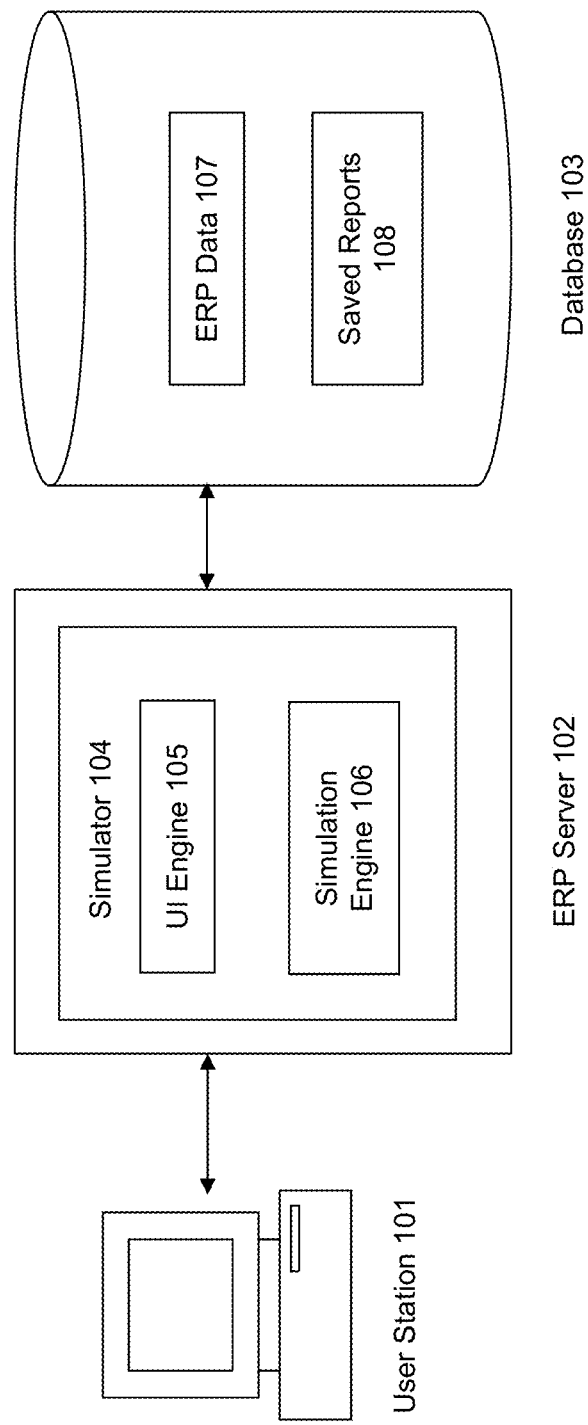
FIG. 1 illustrates an architecture of a system in accordance with embodiments of the invention.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of enterprise resource planning ("ERP") applications. It is noted, however, that the invention is not limited in its scope to ERP applications, and indeed, may be applied to other types of applications as well.

As noted above, there is a need for an approach to implement applications with the ability to perform large what-if scenarios over large numbers of sales order records on the fly. Some embodiments of the invention address this problem by providing an interactive application in an ERP system that allows users to generate reports and forecasts from existing ERP data, and perform what-if modifications to their forecast. The reports and forecasts representing the data is a graphical format to the user.

The insight into revenue and profit drivers given by embodiments of the invention provides numerous advantages, since it permits an organization to improve decision making for product pricing and reduces the risk of incorrect pricing. When sales executives can analyze "what if" scenarios, they gain visibility into factors that drive revenue and profit and make informed decisions on future pricing and sales. The variability of cost, price, and forecasts impacts both profit and revenue, and the embodiments of the invention permits real-time "what if" profit simulations to analyze the impact of changes to these factors. Simulations can be performed for changing cost and price conditions along with forecasted demand and sales history, to immediately view the impact on revenue and profit. These analyses on "what if" scenarios using large volumes of data enable one to make quick and informed decisions, by running and analyzing simulations for a variety of changing conditions quickly without creating batch applications or custom reports. This eliminates the need to inquire on cost, price, and forecasts, export the data to a spreadsheet, and then create scenarios within the spreadsheet to determine how changes to these factors impact revenue and profit.

FIG. 1 illustrates an architecture of a system in accordance with embodiments of the invention. The users operate the system at user station 101 to access and utilize an ERP application located on an ERP server 102, which is configured to access ERP data 107 located on database 103. The ERP application contains a simulator 104 with which the user may use to generate on the fly reports and forecasts, and to perform what if modification to their forecast.

Simulator 104 contains a user interface (UI) engine 105 configured to display a graphical user interface (GUI) at user station 101, with which the user may access to initiate simulations for generating reports and forecasts, as well as to specify parameters and conditions for the reports and forecasts. In addition, the user may also use the GUI to specify what if conditions to modify their forecast. UI engine 105 receives these inputs and parameters, and processes them to be used with the simulation engine 106

Simulation engine 106 receives the input parameters from UI engine 105 to perform the simulation. Simulation 106 also retrieves data from ERP data 107 from the database 103 based on the parameters received from UI engine 105 to generate reports on historical data and to create forecasts. The reports generated by simulation engine 106 may be displayed to the user at user station 101, and may include both historical and forecast data. Reports may also be saved to database 103 as a saved report 108. In some embodiments, simulator 104 may be used to load a previously saved report 108 so that in can be compared to other reports. For example, a user may save a report forecasting future revenues, and then load the report several months later in order to compare the forecasted revenues with the actual revenues that occurred in those months. The process of generating reports and forecasts will be explained in greater detail below and in FIG. 2.

The user at the user station 101 operates the system to initiate simulation to generate reports. The user station 101 comprises any type of computing station that may be used to operate or interface with the application server. Examples of such user stations include for example, workstations, personal computers, laptop computers, or remote computing terminals. The user station 101 comprises a display device, such as a display monitor or screen, for displaying interface elements and report data to the user. The user station 101 may also comprise one or more input devices for the user to provide operational control over the activities of the system, such as a mouse, touch screen, keypad, or keyboard. The users of the user station 101 correspond to any individual, organization, or other entity that uses system to access applications on application server 102, such as the ERP interactive application 104 on the application server 105.

The database 103 corresponds to any type of computer readable mediums or storage devices. The computer readable storage devices comprise any combination of hardware and software that allows for ready access to the data within the database. For example, the computer readable storage device could be implemented as computer memory or disk drives operatively managed by an operating system.

Figure 2:
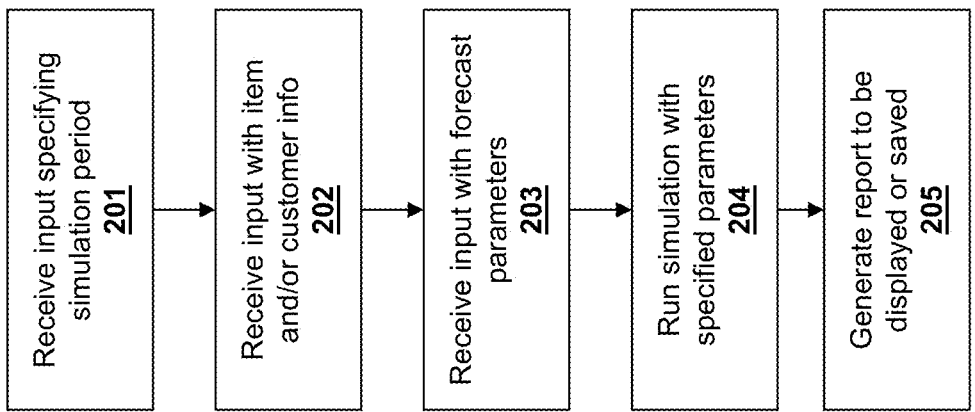
FIG. 2 illustrates a flowchart of a process used to generate profitability reports in accordance with embodiments of the invention.

FIG. 2 illustrates a flowchart of a process for generating on the fly reports and forecasts in accordance with embodiments of the invention. First, at 201, the simulator may receive an input specifying a time period to be reported on or forecast using the simulator UI. The input may be entered by a user using a user interface. Alternatively, in the absence of user input, the system may be configured to use a default time period. The time period may be a past time period, a future time period, or both. In some embodiments, the time period may comprise a start date, signifying when the user wishes the report to begin. For example, the user may wish to view sales trends for a seasonal product over several years and thus will set the start date to be several years back. Alternatively, the user may only wish to view data from the past three months. The start date may also be set in the future to generate a forecast.

In some embodiments, the input may specify a number of periods to show in the report. A period may be a preconfigured length of time, such as a week, a month, a quarter, or a year. The length of a period will influence the granularity of the simulated report data. A number of periods may be selected so that both past data and future forecast data will be included in the report. For example, the user may specify a start date three months in the past, and six 1-month periods, so that the report will include data for the past three months and forecasts for the next three months.

Next, at 202, the simulator may receive inputs specifying specific products or product families to be analyzed using the UI engine. In some embodiments, the input may specify a customer or group of customers to analyze. This may be desirable if a user wishes to be able to analyze or forecast profitability or revenue due to sales to particular customers, or a customer group. For example, a customer group may comprise customers in the same industry (e.g., customers in the high tech industry) or in the same geographic region (e.g., customers located in California). In some embodiments, the user may also specify a location or facility. For example, the user may wish to analyze profitability of products originating from a specified facility.

When creating a report that includes future forecast data, the simulator may receive inputs specifying forecast parameters at 203. This allows for input comprising cost, price, and sales volume parameters in order to generate what-if scenarios to be forecast, and to analyze how profits and revenue may be affected by unforeseen circumstances or sudden changes in the market. For example, the user may be aware of or wish to simulate a supply shortage that may cause the cost of manufacturing a unit of the product to rise by 5%. The change may be input into the simulator so that the user may generate a report to see how the rise in costs will affect future profit and revenue. Alternately, the user may wish to generate a forecast for a hypothetical scenario where prices for the product are increased by 3%. The user may also modify the amount of product expected to be sold. These changes in cost, price, and sales volume may be specified in numbers (e.g., increase unit price of product by $1) or percentages (e.g., decrease unit price of product by 5%).

Once the desired parameters have been input, the simulator runs the simulation at 204. The simulation retrieves ERP data from the database based on user inputted time, product, and customer parameters. The simulation may generate reports on past time periods using the historical ERP data, or generate forecasts for future time periods based on the retrieved data and one or more forecast algorithms. Those skilled in the art may appreciate that there are many algorithms that may be used to generate forecasts, such as rolling average or exponential algorithms. If the input includes forecast parameters such as cost, price, or forecasted quantity modifiers, these may be applied to the forecast algorithms.

At 205, upon the conclusion of the simulation, a report is generated and displayed graphically to the user at a user station. The report may include both historical data and future forecasts, and include charts and figures on price, cost, profit margin, revenues, and profits.

The report may also be saved to the database. In some embodiments, saved reports may be used for comparisons with later simulations. For example, a user may generate and save a report that forecasts profits for the next 3 months. Three months later, the user may run a new simulation to generate a report on the 3 months that were covered in the earlier forecast, and then load the previous report so that the forecasted data may be compared with the actual data and analyzed.

Figure 3A:
FIGS. 3A-F illustrate example screenshots of an ERP application in accordance with embodiments of the invention.

FIGS. 3A-F illustrate screenshots of an example ERP application used to generate on the fly reports in accordance with embodiments of the invention. FIG. 3A illustrates a screenshot 302 of an example ERP application with a simulator in accordance with embodiments of the invention. The application UI contains a tab with fields so that the user has the ability to provide a date for which to start the simulation, the number and size of the periods to display, the item or item group, customer or customer group, and specific facility containing the item.

Figure 3B:
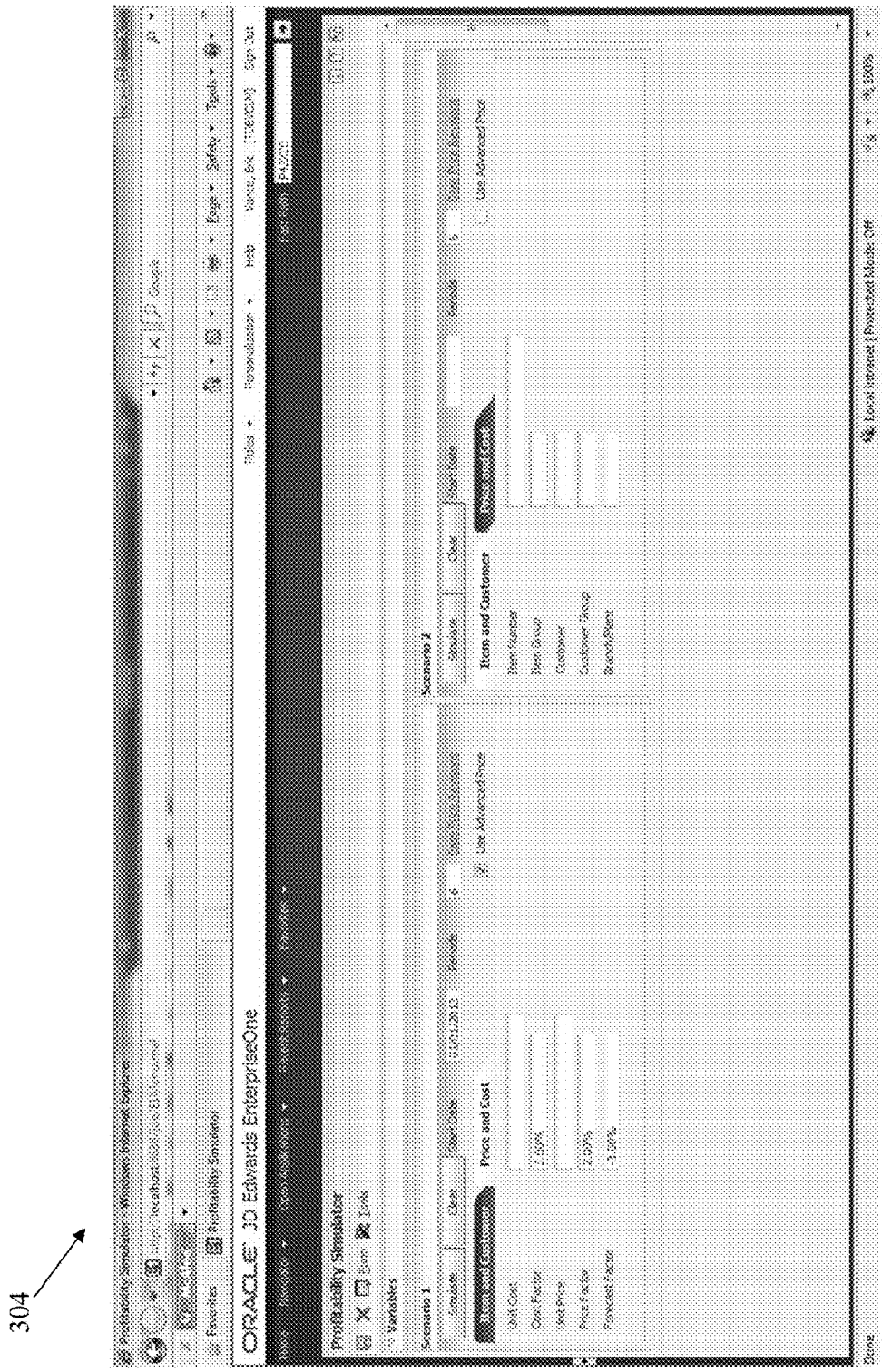

FIG. 3B illustrates an example interface 304 for a second tab where the user then inputs a percentage for which they believe the price, cost, or forecasted sales volume of the item will increase or decrease in the future.

Figure 3C:
Figure 3D:
Figure 3E:

When the inputting of user parameters is complete, the user can then press the simulation button. FIG. 3C illustrates an example interface 306 that graphically represents a price vs. cost chart. FIG. 3D illustrates an example interface 308 that graphically represents profit margin and revenue charts. FIG. 3E illustrates an example interface 310 that graphically represents revenue and profits charts. The report includes both past historical data and future forecast data.

Figure 3F:
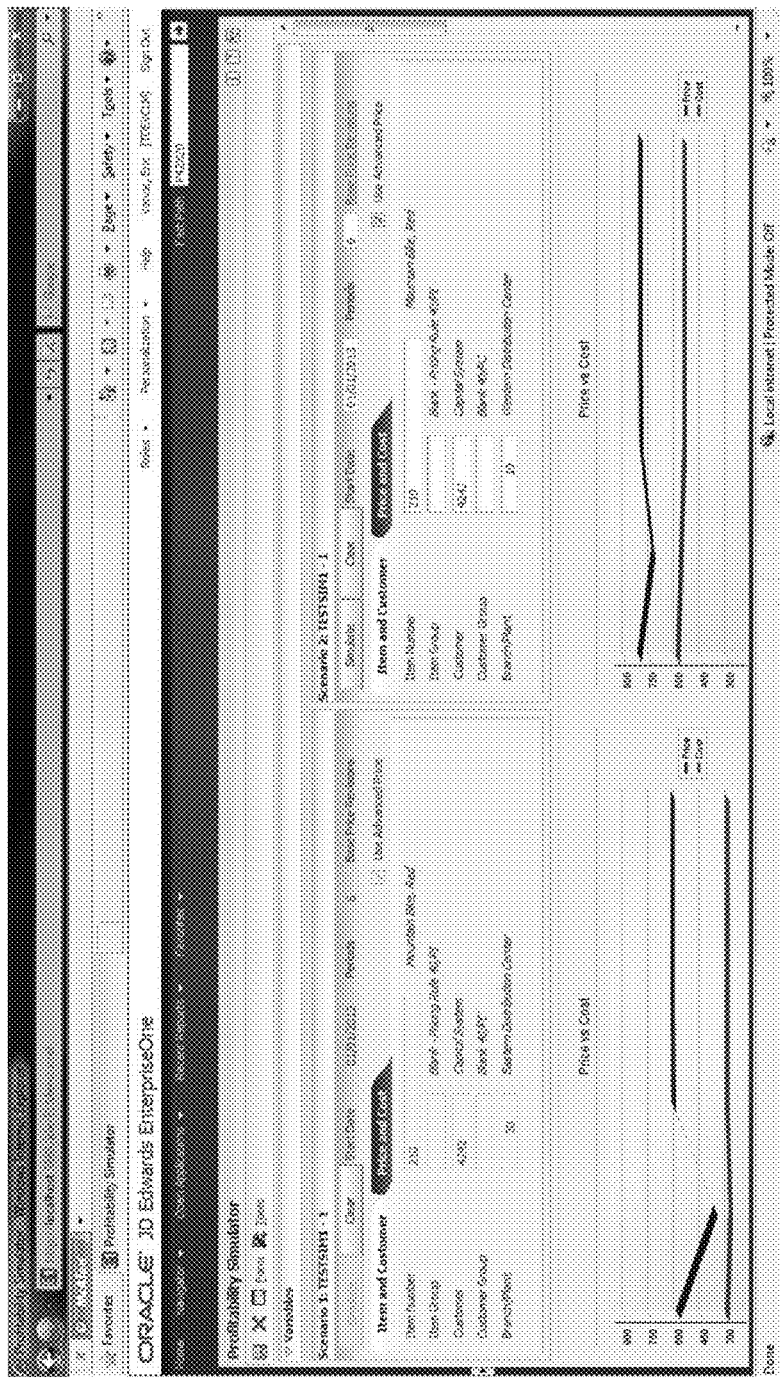

At some future point in the future the user then restores the old saved information, and can run it against a new simulation, as illustrated in the example interface 312 of FIG. 3F. The report from the new simulation and the old report may be displayed side by side to allow for comparison and analysis.

These user interfaces enables the user to view and compare profit and revenue scenarios for a specified period with graphic chart display. The charts depict information related to price and cost comparison, profit margin, revenue, and profit. Each chart displays its respective information based on the period type (weekly, monthly, quarterly, yearly) and the number of periods that is specified.

One possible type of chart (as shown in FIG. 3C) is the Cost vs. Price chart (line chart). This line chart displays two lines that compare the item price to the item cost for the specified number of periods. The x-axis is the date with increments based upon the number of periods and the y-axis is the currency amount.

Another type of chart is the Profit Margin chart (bar chart), which is shown in the top portion of FIG. 3D. This bar chart displays a vertical bar for each period based on the number of periods that is specified. It compares the profit margin for each period to show a view of historical and forecast trends based on the start date that is specified. The x-axis is the date with increments based upon the number of periods. The y-axis is the profit margin percent.

The bottom portion of FIG. 3D and the top portion of FIG. 3E illustrates a Revenue chart (bar chart). This bar chart displays a vertical bar for each period based on the number of periods that is specified. It compares the revenue for each period to show a view of historical and forecast trends based on the start date that you specify. The x-axis is the date with increments based upon the number of periods. The y-axis is the currency amount.

The bottom portion of FIG. 3E illustrates a Profit chart (bar chart). This bar chart displays a vertical bar for each period based on the number of periods that is specified. It compares the profit for each period to show a view of historical and forecast trends based on the start date that is specified. The x-axis is the date with increments based upon the number of periods. The y-axis is the currency amount.

Figure 4A:
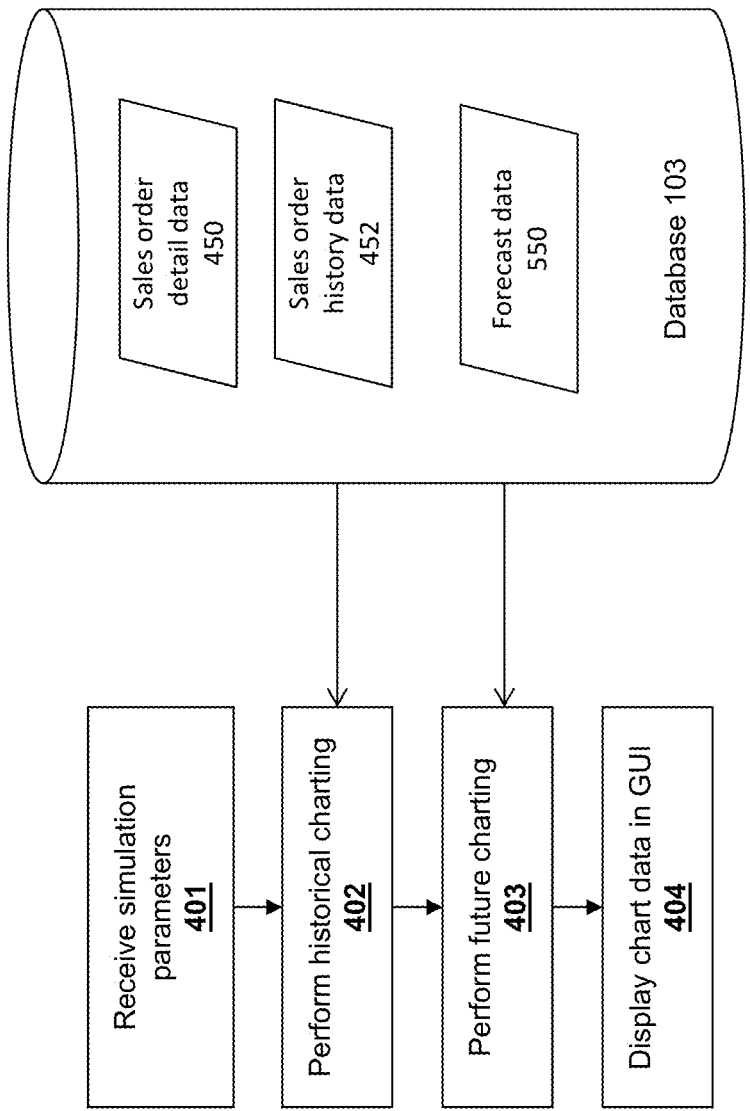
FIG. 4A illustrates a process for generating profitability reports in accordance with embodiments of the invention.

FIG. 4A illustrates a high level flowchart of an approach that can be taken to generate these charts. The process uses historical data stored in various tables in a database 103. For example, a sales order detail table 450 and sales order history tables 452 may be accessed to generate the charts. For future quantities and price information, the process also accesses forecast data 550. In addition, the process may also access additional information, such as item base price data and item cost data. In some embodiments, price adjustment data may also be used for the simulations.

The process begins at 401 by receiving simulations parameters from the user. These items of information may be entered, for example, using the interface shown in FIG. 3A-C where a user enters values into some or all of the interface fields. In some embodiments, when one runs scenarios for the future, information/parameters to be entered include item, customer, and branch/plant information to retrieve future adjusted price information. To fetch historical price information, item information is entered and the system then uses the actual information in the past.

The item pertains to the specific item for which simulations are to be requested, and in some embodiments can be in short, long, or third item number format. The Item Group identifies an inventory price group for an item. Item price groups have unique pricing structures that direct the system to incorporate discounts or markups on items on sales orders. The discounts or markups are based on the quantity, dollar amount, or weight of the item ordered. When one assigns a price group to an item, the item takes on the same pricing structure defined for the inventory price. In some embodiments, when one enters an item number and an item group, the system simulates pricing based on the item group.

The Customer identifies the customer of interest, and in some cases pertain a user-defined name and/or number that identifies an address book record. When the system locates the record, it returns the address book number to the field. The Customer Group pertains to an optional way of organizing pricing schemes. One can set up customer price groups to enter and update price information for multiple customers simultaneously. For example, one can create a customer price group for preferred customers, named PREFER, who purchase a bike for 420.00 USD, while other customers buy the bike at 450.00 USD. A simple price group is a group of customers that are assigned to the same group name. A complex customer price groups can be created, where the complex price groups pertain to groups of customers that are assigned to a group name, but might be part of a different subgroup. One can define subgroups in a complex price group with values that are assigned to category codes such as customer geographic location, line of business, or sales volume. Branch/Plant information pertain to an alphanumeric code that identifies a separate entity within a business for which one might want to track costs. For example, a business unit might be a warehouse location, job, project, work center, branch, or plant.

In some embodiments, one can enter item price and item cost information instead of pricing information in the system. The price and cost criteria to enter for simulations include, for example, some or all of the following:

Unit Cost—This is a value that is used to project a static cost for future periods.

Cost Factor (%)—This value is applied to the future cost for future periods. The system uses the factor value to adjust the cost value in the Unit Cost field or the cost retrieved from the item costs records. One can enter a positive or negative value.

Unit Price.—This is a value the system uses to project a static price for all future periods.

Price Factor (%)—This is a factor value that the system applies to the future price for future periods. The system uses the factor value to adjust the price value in the Unit Price field above or the price retrieved from the advanced price adjustment schedule, or the base price records.

Forecast Factor (%)—This is a factor value that the system applies to the future forecast for future periods. The system uses the factor value to adjust the forecast quantity retrieved from the forecast.

In some embodiments, processing options can be used to specify company and forecast information that the system uses to process simulation information. These options also specify which charts the system shows or hides. The Company information is used, for example, to determine the currency to display on all amount fields. The Period Type specifies the amount of time between periods. The types include, for example, (a) weekly, (b) monthly, (c) quarterly, and (d) yearly. The Number of Periods specifies the number of periods for which the simulation/charting is required. An order template can be used, e.g., to obtain a standard quantity for an item/customer that the system uses to find a future price. One or more simulation modes may also be specified, e.g., for single mode or comparison mode.

The user may seek a chart that provides details both for past sales data as well as projections for future sales data. For example, the user may seek to generate profitability chart for the entire month of March, but it may already be in the middle of March when the user starts the process. As a result, actual sales data already exists for the first part of March that can be used to generate accurate chart details for the first part of March. Therefore, at 402, historical sales data are accessed to provide the raw data for the historical charting. In contrast, the rest of March is still in the future and hence does not correspond to historical data. Instead, at 403, forecasted data is used to generate the charting for the future dates. The system uses historical data stored in the sales order detail data 450 and sales order history tables 452. For future quantities and price information, the system uses information stored in the forecast data 550, including for example, forecast file, item base price data, and item cost data.

At 404, both the data for the historical charting and the data for the future charting are displayed in the user interface and displayed to the user. The interface may include visual differences between historical data and forecasted data.

Figure 4B:
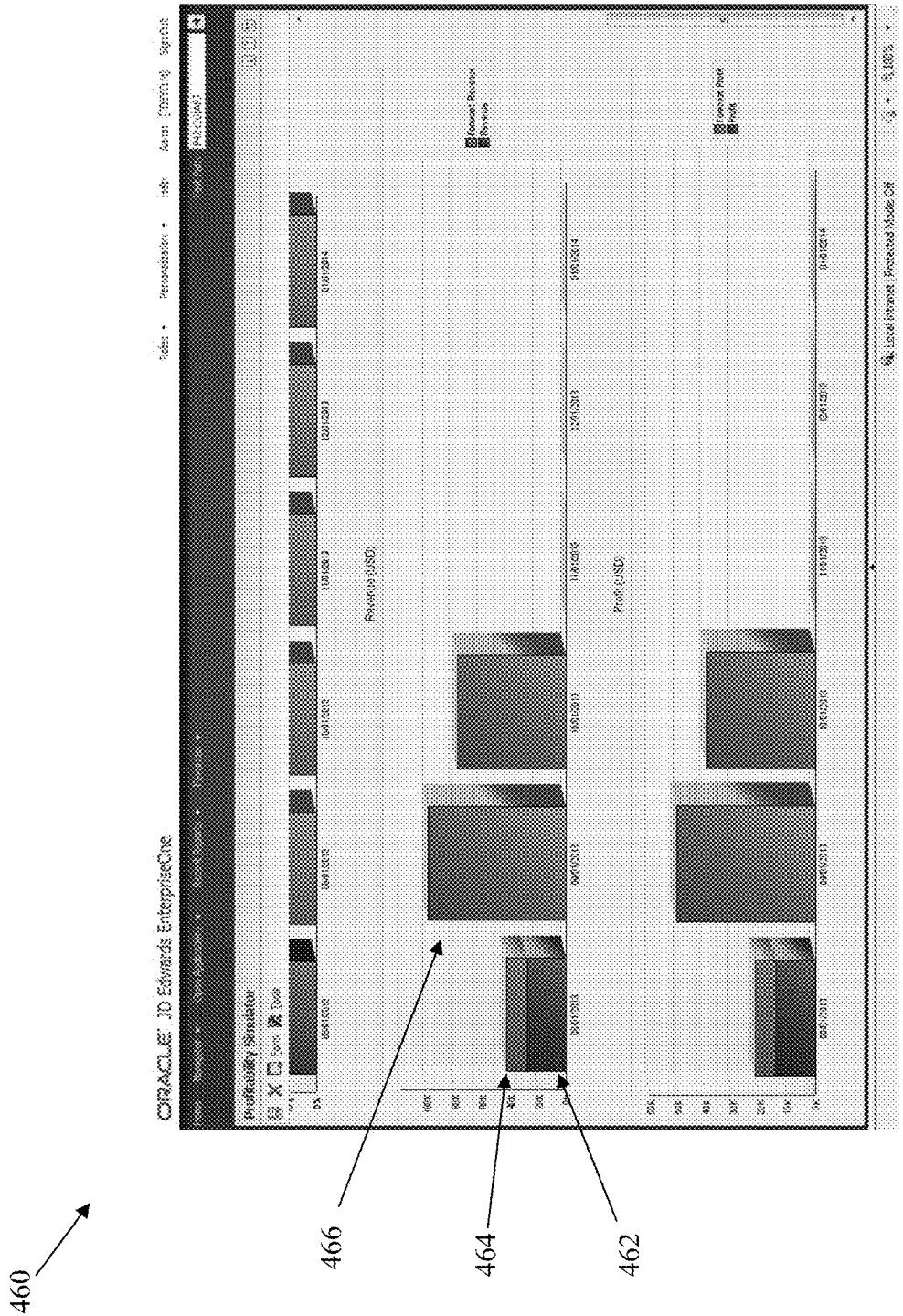
FIG. 4B illustrates an example interface that can be used to display charts for profit simulation.

FIG. 4B illustrates an example interface 460 that can be used to display charts for profit simulation. Here, the combination of portions 462 and 464 correspond to the charting for a given time period (e.g., month) of the simulation, where a part of the time period has already elapsed and a part of the time period is still in the future. Portion 462 indicates the charting of the historical data, based at least in part upon actual sales data that have already been compiled in the past. Portion 464 indicates the charting of future dates based at least in part upon forecasted data. It is noted that these two portions are visually distinct from one another, e.g., using differing colors, shadings, or the like. Additional time period in the future (e.g., represented by portion 466) may also be associated with the visual cues that are used for portion 464.

Figure 5:
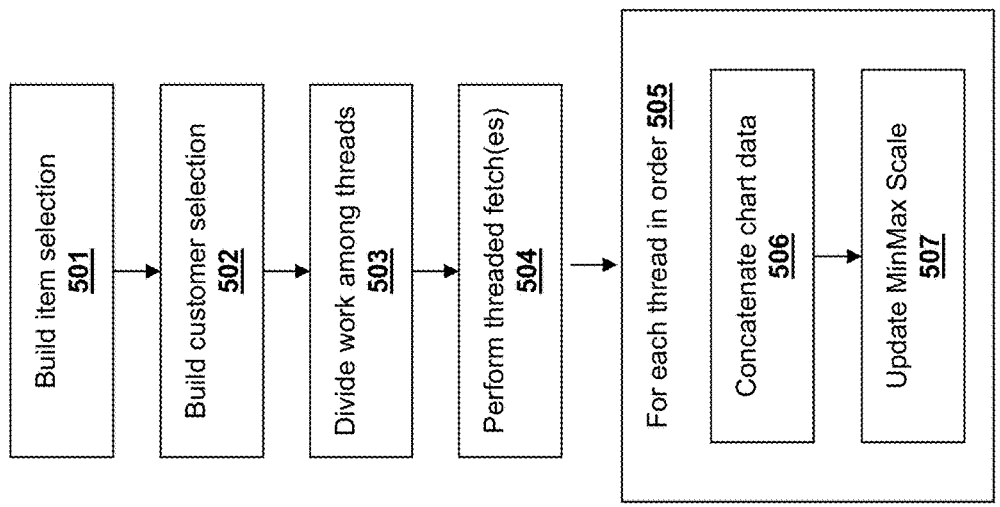
FIG. 5 illustrates an approach for processing historical data according to some embodiments of the invention.

FIG. 5 illustrates an example approach that can be taken to access historical sales data to generate the historical charting. At 501, an item selection is built for the historical charting. If the user desires charting for only a single item, then this step simply identifies the item for which item selection is to be performed. However, it is possible that the user may seek charting for multiple items, e.g., using an item group. If this is the case, then codes can be fetched for the group, where the item selection is built around the code(s) that pertain to the item group. Similarly, at 503, a customer selection is built for the historical charting with respect to the selected customer(s). If the user desires charting for only a single customer, then this step simply identifies the customer for the charting. However, it is possible that the user may seek charting for multiple customers, e.g., using a group. If this is the case, then codes can be fetched for the group, where the item selection is built around the code(s) that pertain to the group. These selections are used to populate the predicates for queries that are issued against historical sales tables.

In some embodiments, parallel processing can be performed to handle the work involved in the charting. The reason for this is because the work to generate the charts may involve long-running queries, and hence may be more efficiently processed in parallel. The processing can be performed by any work entity, such as a thread, process, or task (which are collectively referred to herein as "threads"). Therefore, at 503, the work is divided among the different threads. This can be accomplished, for example, by building multiple thread groups where the work among the threads is divided according to a work partitioning criteria, e.g., where the work is partitioned by date ranges. Thereafter, at 504, the threaded fetches are performed by the multiple threads in parallel. These fetches are performed to gather the requested data from the historical tables pursuant to the items selection and customer selection that were constructed. In addition, the fetched data is processed to calculate the requested data for the user, e.g., to perform the profit determination using the item sales and costs data. In some embodiments, the manipulation and calculations using the prices and costs data is performed by first converting the data into a common currency.

At 505, the results from each thread are obtained and used to build the historical portion of the chart data. Assuming that the work has been divided among the threads by data range, then the threads are processed in order based upon the ordering of the date ranges that were processed by the threads.

In some embodiments, the chart data is maintained as a XML string structure. Therefore, at 506, the chart data within the XML string is concatenated with the results from each succeeding thread for each succeeding date range processed by that thread. This builds up the chart data over the entire range of historical time periods that were processed by the different threads.

At 507, the scaling for the chart can be updated to reflect the updated charting data. For example, a minimum and/or maximum scale can be updated for the charts, e.g., to adjust the scale of the y-axis for the charts shown in the example bar charts of FIG. 4B. This ensures that the scaling for the charts shown in the user interface matches the actual data collected by the different threads.

Figure 6:
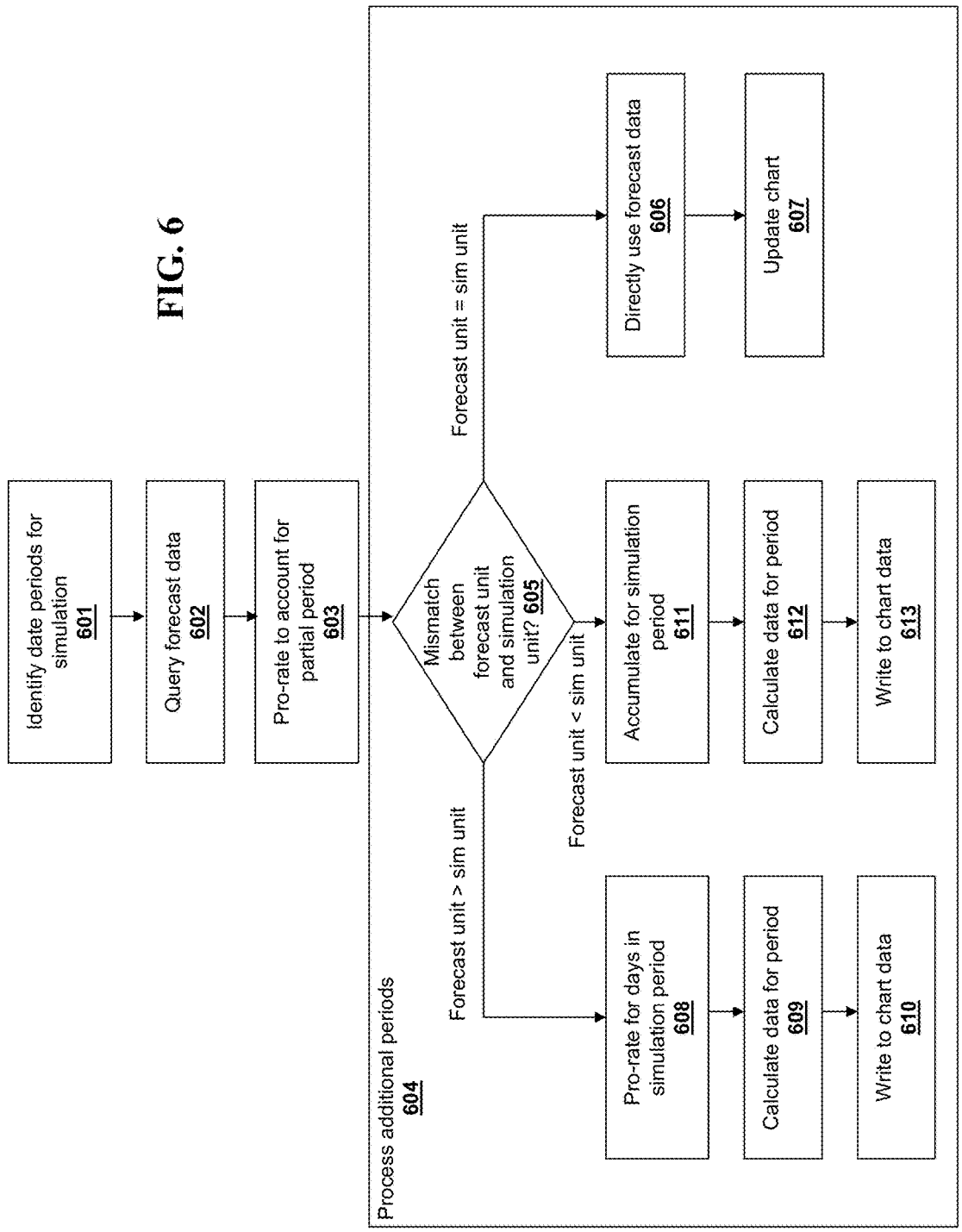
FIG. 6 illustrates an approach for processing future data according to some embodiments of the invention.

FIG. 6 illustrates an example approach that can be taken to generate the charts for the future dates. As discussed in more detail below, forecasted data can be generated that are accessed to perform profit simulation for future time periods. FIG. 6 pertains to the process of accessing that forecasted data to perform the chartings for the future time periods. Therefore, at 601, the date periods for the simulation are identified, e.g., by identifying the time periods identified by the user as desired for the simulation.

Next, at 602, a query is made to the forecast data for the specified time periods. As previously noted, the date periods for the simulation was identified by identifying the time periods identified by the user as desired for the simulation. One reason for identifying the user-requested time period for the charting is because of the possibility of an overlap with historical time periods with respect to the time period for the forecasting. For example, consider the example situation where the user seeks to generate a profitability chart for the entire month of March, but it may already be in the middle of March when the user starts the process. In this case, the forecasting may have been performed already for the entire month of March, even though part of the month is already in the past. To address this, at 603, the query results from the forecast data is pro-rated so that the first part of the future portion of the chart only includes forecast data for the first future time period. This pro-rating step is used to generate, for example, portion 464 of the chart in FIG. 4B.

Thereafter, at 604, additional simulation time periods are processed to generate the additional portions of the chart, e.g., portion 466 in FIG. 4B. This is performed by gathering forecast data for the additional future time periods and to add that data to the XML string of the chart.

One problem that may potentially arise is that a mismatch exists between the unit of time that was used to generate the forecasted data and the unit of time requested by the user for the simulation charts. In some cases the unit of time in the forecast data is larger than the unit of time for the requested charts. For example, the forecast data may be based upon a monthly forecast, whereas the user has requested a chart showing weekly projections of profitability. In other cases the unit of time in the forecast data is smaller than the unit of time for the requested charts. For example, the forecast data may be based upon a weekly or daily forecast, whereas the user has requested a chart showing monthly projections of profitability. In both cases, this creates significant problem to implement profitability simulations.

The present invention is able address any such mismatches that may exist between the units of time for the source data and the charts. At 605, a determination is made whether any mismatch exists between the unit of time for the forecast data and the unit of time for the requested charts. If no mismatch exists, then at 606 the forecast data is directly used to generate the requested profitability data, e.g., by calculating price and cost for the items of interest and to then determine profitability. Thereafter, at 607, the chart data is updated with the calculation results.

However, if the unit of time for the forecast data is larger than the unit of time for the requested charts, then additional processing is performed. At 608, the gathered forecast data is pro-rated for the days in the simulation time period unit. For instance, assume that the forecast data is based upon a monthly forecast, whereas the user has requested a chart showing weekly projections of profitability. In this case, the monthly forecast data is pro-rated for each week of the simulation time period. That pro-rated data is then used, at 609, to generate the requested profitability data, e.g., by calculating price and cost for the items of interest and to then determine profitability. Thereafter, at 610, the chart data is updated with the calculation results.

If the unit of time for the forecast data is smaller than the unit of time for the requested charts, then additional processing is also performed. At 611, the gathered forecast data is accumulated over multiple forecasted time periods, sufficient to match the simulation time period unit. For example, the forecast data may be based upon a daily forecast, whereas the user has requested a chart showing monthly projections of profitability. In this case, the daily forecast data is gathered over the time period equivalent for the entire month, to match the monthly simulation time period. That accumulated data is then used, at 612, to generate the requested profitability data, e.g., by calculating price and cost for the items of interest and to then determine profitability. Thereafter, at 613, the chart data is updated with the calculation results.

The next section of this disclosure will discuss some example forecasting approaches that can be used in the invention. In some embodiments, forecasting is performed according to some or all of the following approaches:

Method 1: Percent Over Last Year.
Method 2: Calculated Percent Over Last Year.
Method 3: Last Year to This Year.
Method 4: Moving Average.
Method 5: Linear Approximation.
Method 6: Least Squares Regression.
Method 7: Second Degree Approximation.
Method 8: Flexible Method.
Method 9: Weighted Moving Average.
Method 10: Linear Smoothing.
Method 11: Exponential Smoothing.
Method 12: Exponential Smoothing with Trend and Seasonality.

The "Percent Over Last Year" approach uses a formula to multiply each forecast period by the specified percentage increase or decrease. To forecast demand, this method uses the number of periods for the best fit plus one year of sales history. This method is useful to forecast demand for seasonal items with growth or decline. The Percent Over Last Year formula multiplies sales data from the previous year by a specified factor and then projects that result over the next year. This method might be useful, for example, in budgeting to simulate the effect of a specified growth rate or when sales history has a significant seasonal component.

The "Calculated Percent Over Last Year" approach compares the past sales of specified periods to sales from the same periods of the previous year. The system determines a percentage increase or decrease, and then multiplies each period by the percentage to determine the forecast. To forecast demand, this method uses the number of periods of sales order history plus one year of sales history. This method is useful to forecast short term demand for seasonal items with growth or decline. This method might be useful, for example, in projecting the effect of extending the recent growth rate for a product into the next year while preserving a seasonal pattern that is present in sales history.

The "Last Year to This Year" approach uses the number of periods for a best fit plus one year of sales order history. Therefore, this approach copies sales data from the previous year to the next year. This method is useful, for example, to forecast demand for mature products with level demand or seasonal demand without a trend. In addition, this approach may be useful in budgeting to simulate sales at the present level, where the product is mature and has no trend over the long run, but a significant seasonal demand pattern might exist.

The "Moving Average" approach averages the specified number of periods to project the next period. Moving Average (MA) is a popular method for averaging the results of recent sales history to determine a projection for the short term. To forecast demand, this method uses the number of periods for best fit plus the number of periods of sales order history. This method is useful, for example, to forecast demand for mature products without a trend.

The "Linear Approximation" approach computes a trend from the number of periods of sales order history and to project this trend to the forecast. This method uses the number of periods of best fit plus the number of specified periods of sales order history. This method is useful to forecast demand for new products, or products with consistent positive or negative trends that are not due to seasonal fluctuations. In some embodiments, Linear Approximation calculates a trend that is based upon two sales history data points. Those two points define a straight trend line that is projected into the future.

The "Least Squares Regression" (LSR) approach derives an equation describing a straight line relationship between the historical sales data and the passage of time. LSR fits a line to the selected range of data so that the sum of the squares of the differences between the actual sales data points and the regression line are minimized. The forecast is a projection of this straight line into the future. This method uses sales data history for the period that is represented by the number of periods best fit plus the specified number of historical data periods.

The "Second Degree Approximation" approach plots a curve that is based on the number of periods of sales history. This method uses the number of periods best fit plus the number of periods of sales order history times three. In some embodiments, Second Degree Approximation determines values for a, b, and c (e.g., in the forecast formula $Y=a+bX+c\ X^2$), where the objective is to fit a curve to the sales history data. This method is useful, for example, when a product is in the transition between life cycle stages. For example, when a new product moves from introduction to growth stages, the sales trend might accelerate. Because of the second order term, the forecast can quickly approach infinity or drop to zero (depending on whether coefficient c is positive or negative).

The "Flexible" approach enables one to select the best fit number of periods of sales order history that starts n months before the forecast start date, and to apply a percentage increase or decrease multiplication factor with which to modify the forecast. This method is similar to Method 1, Percent Over Last Year, except that one can specify the number of periods to use as the base. Depending on what is selected as n, this method uses periods best fit plus the number of periods of sales data that is indicated.

The "Weighted Moving Average" approach is similar to the "Moving Average" approach, because it averages the previous month's sales history to project the next month's sales history. However, the "Weighted Moving Average" allows one assign weights for each of the prior periods. This method uses the number of weighted periods selected plus the number of periods best fit data. Similar to Moving Average, this method lags behind demand trends, so this method is not recommended for products with strong trends or seasonality. This method is useful to forecast demand for mature products with demand that is relatively level.

The "Linear Smoothing" approach calculates a weighted average of past sales data. In the calculation, this method uses the number of periods of sales order history (e.g., from 1 to 12) that is indicated in the processing option. The system uses a mathematical progression to weigh data in the range from the first (least weight) to the final (most weight). Then the system projects this information to each period in the forecast. This method uses the month's best fit plus the sales order history for the number of periods that are specified in the processing option.

Therefore, this method is similar to Method 9 for the "Weighted Moving Average", but instead of arbitrarily assigning weights to the historical data, a formula is used to assign weights that decline linearly and sum to 1.00. The method then calculates a weighted average of recent sales history to arrive at a projection for the short term. Like many linear moving average forecasting techniques, forecast bias and systematic errors may occur when the product sales history exhibits strong trend or seasonal patterns. This method works better for short range forecasts of mature products than for products in the growth or obsolescence stages of the life cycle.

The "Exponential Smoothing" approach calculates a smoothed average, which becomes an estimate representing the general level of sales over the selected historical data periods. This method uses sales data history for the time period that is represented by the number of periods best fit plus the number of historical data periods that are specified (e.g., where the minimum is two historical data periods). This method is useful to forecast demand when no linear trend is in the data. The equation for Exponential Smoothing forecasting in some embodiments (e.g., Forecast=$\alpha$(Previous Actual Sales)+$(1-\alpha)$ (Previous Forecast)) generates a forecast that is a weighted average of the actual sales from the previous period and the forecast from the previous period. Alpha is the weight that is applied to the actual sales for the previous period. $(1-\alpha)$ is the weight that is applied to the forecast for the previous period. Values for alpha range from 0 to 1 and usually fall between 0.1 and 0.4. The sum of the weights is 1.00 ($\alpha+(1-\alpha)=1$). One should assign a value for the smoothing constant, alpha. If a value is not assigned for the smoothing constant, an assumed value should be calculated that is based on the number of periods of sales history that is specified.

The "Exponential Smoothing with Trend and Seasonality" approach calculates a trend, a seasonal index, and an exponentially smoothed average from the sales order history. The system then applies a projection of the trend to the forecast and adjusts for the seasonal index. This approach uses the number of periods best fit plus two years of sales data, and is useful for items that have both trend and seasonality in the forecast. This approach is similar to the "Exponential Smoothing" approach, in that a smoothed average is calculated. However, the current method also includes a term in the forecasting equation to calculate a smoothed trend. The forecast is composed of a smoothed average that is adjusted for a linear trend. When specified in the processing option, the forecast is also adjusted for seasonality.

In some embodiments, the approach uses an Alpha that equals the smoothing constant that is used in calculating the smoothed average for the general level or magnitude of sales, where values for alpha range from 0 to 1. The Beta equals the smoothing constant that is used in calculating the smoothed average for the trend component of the forecast, where values for beta range from 0 to 1. For the sales history, the system should receive one year plus the number of time periods that are required to evaluate the forecast performance (periods of best fit). When two or more years of historical data is available, the system may use two years of data in the calculations. Two Exponential Smoothing equations and one simple average to calculate a smoothed average $(A_t=\alpha(D_t/S_{t-L})+(1-\alpha)(A_{t-1}+T_{t-1}))$, a smoothed trend ($T_t=\beta(A_t-A_{t-1})+(1-\beta)T_{t-1}$), and a simple average seasonal index. The forecast is then calculated by using the results of the three equations (e.g., $F_{t+m}=(A_t+T_tm)S_{t-L+m}$), where L is the length of seasonality (e.g., L equals 12 months or 52 weeks), t is the current time period, m is the number of time periods into the future of the forecast, and S is the multiplicative seasonal adjustment factor that is indexed to the appropriate time period.

Therefore, what has been described is an improved approach for generating on the fly sales reports and what if forecasts, using an ERP system.

System Architecture Overview

Figure 7:
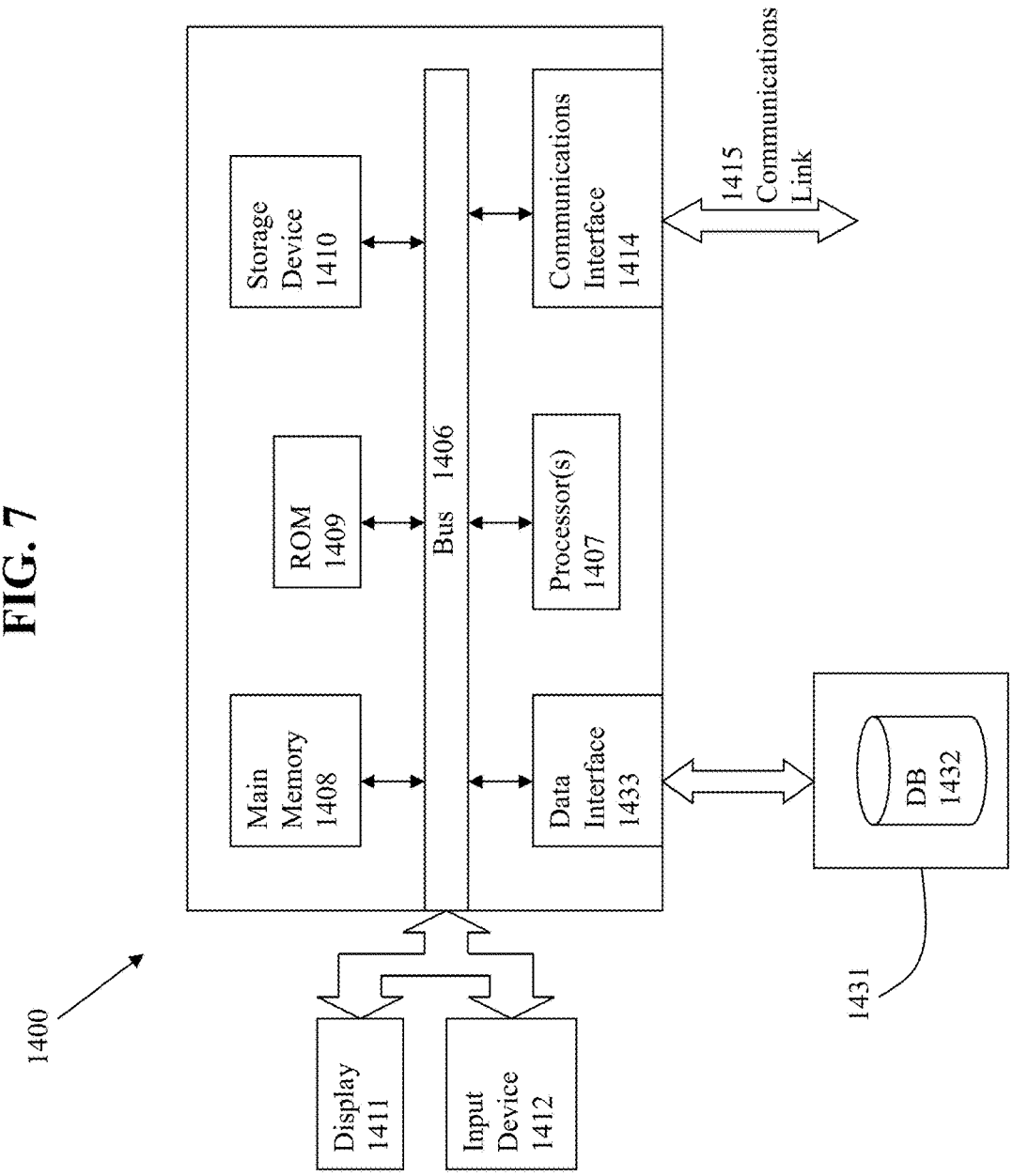
FIG. 7 illustrates a computerized system on which an embodiment of the invention can be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor for generating data reports, comprising:
   receiving inputs comprising a simulation period, simulation information, and a plurality of subsets of the simulation period corresponding to a first granularity of results to be provided in a report of a simulation, wherein a subset of the plurality of subsets of the simulation period corresponds to a time period within the simulation period, wherein a granularity of results is a unit of time corresponding to the results;
   running the simulation based at least in part on the simulation period and the simulation information by:
      performing historical charting with parallel processing by:
         building multiple thread groups wherein work among a plurality of threads is divided according to date ranges,
         performing fetches of historical data in parallel via the plurality of threads, and
         concatenating results from the fetches and updating a scaling to chart results data,
         wherein concatenating results comprises concatenating the results from the fetches into an XML string structure based upon an ordering of the date ranges processed by the plurality of threads; and
      performing future forecast charting by:
         receiving forecast data corresponding to one or more subsets of the plurality of subsets of the simulation period, the one or more subsets of the forecast data having a second granularity of results;
         identifying a mismatch between the first granularity for the report of the simulation and the second granularity of results from the forecast data, wherein the mismatch is due to the first granularity for the report of the simulation being smaller than the second granularity of results from the forecast data; and
         generating data corresponding to the first granularity by determining a proportional amount of forecast data corresponding to the mismatch; and
         adding the data generated to the XML string structure; and
   generating the report of the simulation to be displayed to a user or saved on a database, wherein the report of the simulation is generated using the XML string structure.

2. The method of claim 1, wherein the simulation period comprises a start date and a number of periods.

3. The method of claim 1, wherein the simulation period includes both past and future time.

4. The method of claim 1, wherein simulation information comprises product information, customer information, or product location information.

5. The method of claim 1, further comprising loading a saved report and displaying the report with the saved report.

6. The method of claim 1, wherein the simulation is performed using a process comprising:

receiving simulation parameters for performing the simulation;

performing historical charting by accessing historical sales data; and performing future charting by accessing forecast data.

7. The method of claim 6, wherein at least part of the forecast data was generated before receiving the simulation period and the simulation information.

8. The method of claim 1, wherein generating the report of the simulation to be displayed to a user comprises:

displaying the inputs on a first portion of a graphical user interface display; and displaying the report on a second portion of the graphical user interface display, the report comprising:

the plurality of subsets of the simulation period on an x-axis, and the historical charting and the future forecast charting on a y-axis having a visual difference between historical data and forecasted data, wherein when a subset of the simulation period has a part of time already elapsed and a part of time still in a future, displaying a combination of the historical charting and the future forecast charting, the combination of the historical charting and the future forecast charting having the visual difference displayed within the subset of the simulation period, wherein the report is generated based at least in part on the inputs received and displayed on the graphical user interface, wherein an update to values of the inputs in the first portion of the graphical user interface display results in an immediate update of the report displayed in the second portion of the graphical user interface display.

9. The method of claim 1, wherein scaling is performed to a chart for the report.

10. The method of claim 1, wherein a further mismatch between the first granularity for the report of the simulation and a third granularity of results corresponding to one or more other subsets of the forecast data corresponds to the third granularity of results of the forecast data being smaller than the first granularity for the report of the simulation, and the data for the simulation is adjusted by performing accumulation of the forecast data corresponding to the third granularity of result of the forecast data over multiple time periods.

11. A system for generating sales data reports, comprising:
a processor; and
a memory to hold program code instructions, in which the program code instructions comprises program code to perform:
receiving inputs comprising a simulation period, simulation information, and a plurality of subsets of the simulation period corresponding to a first granularity of results to be provided in a report of a simulation, wherein a subset of the plurality of subsets of the simulation period corresponds to a time period within the simulation period, wherein a granularity of results is a unit of time corresponding to the results;
running the simulation based at least in part on the simulation period and the simulation information by:
performing historical charting with parallel processing by:
building multiple thread groups wherein work among a plurality of threads is divided according to date ranges,
performing fetches of historical data in parallel via the plurality of threads, and
concatenating results from the fetches and updating a scaling to chart results data,
wherein concatenating results comprises concatenating the results from the fetches into an XML string structure based upon an ordering of the date ranges processed by the plurality of threads; and
performing future forecast charting by:
receiving forecast data corresponding to one or more subsets of the plurality of subsets of the simulation period, the one or more subsets of the forecast data having a second granularity of results;
identifying a mismatch between the first granularity for the report of the simulation and the second granularity of results from the forecast data, wherein the mismatch is due to the first granularity for the report of the simulation being smaller than the second granularity of results from the forecast data; and
generating data corresponding to the first granularity by determining a proportional amount of forecast data corresponding to the mismatch; and
adding the data generated to the XML string structure; and
generating the report of the simulation to be displayed to a user or saved on a database, wherein the report of the simulation is generated using the XML string structure.

12. The system of claim 11, wherein the simulation period comprises a start date and a number of periods.

13. The system of claim 11, wherein the simulation period includes both past and future time.

14. The system of claim 11, wherein simulation information comprises product information, customer information, or product location information.

15. The system of claim 11, further comprising loading a saved report and displaying the report with the saved report.

16. The system of claim 11, wherein the program code instructions further comprise program code to perform the simulation comprising:
receiving simulation parameters for performing the simulation;
performing historical charting by accessing historical sales data; and
performing future charting by accessing forecast data.

17. The system of claim 16, wherein at least part of the forecast data was generated before receiving the simulation period and the simulation information.

18. The system of claim 11, wherein generating the report of the simulation to be displayed to a user comprises:
displaying the inputs on a first portion of a graphical user interface display; and
displaying the report on a second portion of the graphical user interface display, the report comprising:
the plurality of subsets of the simulation period on an x-axis, and
the historical charting and the future forecast charting on a y-axis having a visual difference between historical data and forecasted data, wherein when a subset of the simulation period has a part of time already elapsed and a part of time still in a future, displaying a combination of the historical charting and the future forecast charting, the combination of the historical charting and the future forecast charting having the visual difference displayed within the subset of the simulation period,
wherein the report is generated based at least in part on the inputs received and displayed on the graphical user interface, wherein an update to values of the inputs in the first portion of the graphical user interface display results in an immediate update of the report displayed in the second portion of the graphical user interface display.

19. The system of claim 11, wherein scaling is performed to a chart for the report.

20. The system of claim 11, wherein a further mismatch between the first granularity for the report of the simulation and a third granularity of results corresponding to one or more other subsets of the forecast data corresponds to the third granularity of results of the forecast data being smaller than the first granularity for the report of the simulation, and the data for the simulation is adjusted by performing accumulation of the forecast data corresponding to the third granularity of result of the forecast data over multiple time periods.

21. A computer program product including a non-transitory computer readable medium having instructions which, when executed by a processor, causes the processor to perform a process for generating sales data reports, the process comprising:
  receiving inputs comprising a simulation period, simulation information, and a plurality of subsets of the simulation period corresponding to a first granularity of results to be provided in a report of a simulation, wherein a subset of the plurality of subsets of the simulation period corresponds to a time period within the simulation period, wherein a granularity of results is a unit of time corresponding to the results;
  running the simulation based at least in part on the simulation period and the simulation information by:
    performing historical charting with parallel processing by:
      building multiple thread groups wherein work among a plurality of threads is divided according to date ranges,
      performing fetches of historical data in parallel via the plurality of threads, and
      concatenating results from the fetches and updating a scaling to chart results data,
      wherein concatenating results comprises concatenating the results from the fetches into an XML string structure based upon an ordering of the date ranges processed by the plurality of threads; and
    performing future forecast charting by:
      receiving forecast data corresponding to one or more subsets of the plurality of subsets of the simulation period, the one or more subsets of the forecast data having a second granularity of results;
      identifying a mismatch between the first granularity for the report of the simulation and the second granularity of results from the forecast data, wherein the mismatch is due to the first granularity for the report of the simulation being smaller than the second granularity of results from the forecast data; and
      generating data corresponding to the first granularity by determining a proportional amount of forecast data corresponding to the mismatch; and
      adding the data generated to the XML string structure; and
  generating the report of the simulation to be displayed to a user or saved on a database, wherein the report of the simulation is generated using the XML string structure.

22. The computer program product of claim 21, wherein the simulation period comprises a start date and a number of periods.

23. The computer program product of claim 21, wherein the simulation period includes both past and future time.

24. The computer program product of claim 21, wherein simulation information comprises product information, customer information, or product location information.

25. The computer program product of claim 21, further comprising loading a saved report and displaying the report with the saved report.

26. The computer program product of claim 21, wherein the simulation is performed using a process comprising:
  receiving simulation parameters for performing the simulation;
  performing historical charting by accessing historical sales data; and
  performing future charting by accessing forecast data.

27. The computer program product of claim 26, wherein at least part of the forecast data was generated before receiving the simulation period and the simulation information.

28. The computer program product of claim 21, wherein generating the report of the simulation to be displayed to a user comprises:
  displaying the inputs on a first portion of a graphical user interface display; and
  displaying the report on a second portion of the graphical user interface display, the report comprising:
    the plurality of subsets of the simulation period on an x-axis, and
    the historical charting and the future forecast charting on a y-axis having a visual difference between historical data and forecasted data, wherein when a subset of the simulation period has a part of time already elapsed and a part of time still in a future, displaying a combination of the historical charting and the future forecast charting, the combination of the historical charting and the future forecast charting having the visual difference displayed within the subset of the simulation period,
    wherein the report is generated based at least in part on the inputs received and displayed on the graphical user interface, wherein an update to values of the inputs in the first portion of the graphical user interface display results in an immediate update of the report displayed in the second portion of the graphical user interface display.

29. The computer program product of claim 21, wherein scaling is performed to a chart for the report.

30. The computer program product of claim 21, wherein a further mismatch between the first granularity for the report of the simulation and a third granularity of results corresponding to one or more other subsets of the forecast data corresponds to the third granularity of results of the forecast data being smaller than the first granularity for the report of the simulation, and the data for the simulation is adjusted by performing accumulation of the forecast data corresponding to the third granularity of result of the forecast data over multiple time periods.

* * * * *

UNITED STATES PATENT AND TRADEMARK OFFICE
CERTIFICATE OF CORRECTION

PATENT NO. : 10,248,962 B2
APPLICATION NO. : 14/247754
DATED : April 2, 2019
INVENTOR(S) : Mitchell et al.

Page 1 of 1

It is certified that error appears in the above-identified patent and that said Letters Patent is hereby corrected as shown below:

In the Specification

In Column 3, Line 19, delete "106" and insert -- 106. --, therefor.

Signed and Sealed this
Third Day of November, 2020

Andrei Iancu
*Director of the United States Patent and Trademark Office*